A. CROOK AND R. D. CHAPMAN.
METHOD AND MEANS FOR MAKING ARTIFICIAL STONE PRODUCTS.
APPLICATION FILED APR. 11, 1919.
1,346,638. Patented July 13, 1920.
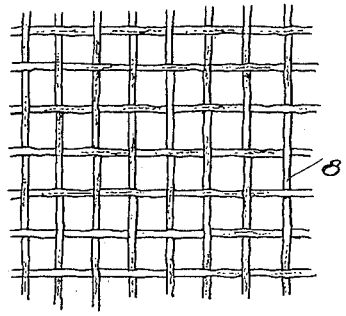
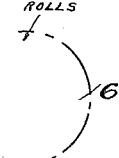
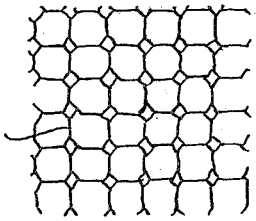
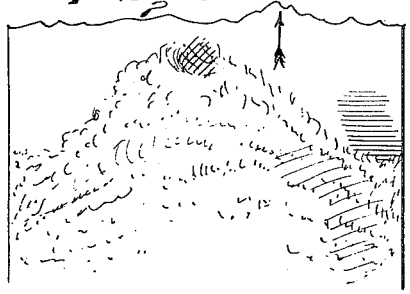
Inventors.
Alfred Crook.
Richard D. Chapman.
by,
Attorney.

UNITED STATES PATENT OFFICE.

ALFRED CROOK AND RICHARD D. CHAPMAN, OF PHILADELPHIA, PENNSYLVANIA, ASSIGNORS TO TAYLOR-WHARTON IRON AND STEEL COMPANY, OF HIGH BRIDGE, NEW JERSEY, A CORPORATION OF NEW JERSEY.

METHOD AND MEANS FOR MAKING ARTIFICIAL-STONE PRODUCTS.

1,346,638.      Specification of Letters Patent.      Patented July 13, 1920.

Application filed April 11, 1919. Serial No. 289,346.

*To all whom it may concern:*

Be it known that we, ALFRED CROOK and RICHARD D. CHAPMAN, citizens of the United States, residing at Philadelphia, in the county of Philadelphia and State of Pennsylvania, have invented certain new and useful Improvements in Methods and Means for Making Artificial-Stone Products, of which the following is a specification.

Artificial stone slabs or plates for use as shingles and the like and composed of asbestos and a binder, such as hydraulic cement set in water, have heretofore and before our invention been made in various ways, but principally by the so-called cardboard machine method and by pressing in molds. The resultant products are fairly good, but the methods are both crude and costly.

It has also been proposed and attempts have been made to produce the slabs, plates or shingles through the agency of squeezing rolls. In this type of machine the material was deposited upon the apron or carrier in a ready-mixed plastic state, or the asbestos and cement materials, separately or comingled, were laid and then sprayed with water. Such methods as well as the machines for carrying them into effect have proven commercially unsatisfactory and the products thereof are of very inferior quality.

The principal object of our invention is to provide a method and means for rapidly and economically forming from artificial stone material, slabs, sheets, plates, or other objects, for use as water and fire-proof roofing, wall and ceiling panels, and the like.

Generally stated, the method consists in projecting under considerable force or pressure, onto an upwardly traveling inclined belt or apron, a continuous or constant stream or jet of divided asbestos material, hydraulic cement or other suitable binder with or without a retarder, and water, whereby to complete the mixing initially started in the stream and to cause the mixture to spread, level or gage itself automatically, in which state it is rapidly advanced to and acted upon by pressure rolls, any excess fluid operating to run down the apron into a suitable collector. The asbestos and cement may be applied separately or they may be first co-mingled and then impelled by water, or wet steam, under pressure, or an appropriate mixture of asbestos and cement with sufficient water to effect the mixture may be projected, for example, by air pressure, or a substantially fluid charge of cement may be forcibly directed against a loose woven or interlaced sheet of asbestos carried by the apron, any and all of which alternative measures are contemplated by the invention. The method may or may not include other details hereinafter enlarged upon.

Referring to the drawings forming a part hereof:—

Figure 1 shows the general arrangement of apparatus for carrying the invention into effect.

Fig. 2 is a face view of the carrier or apron showing how the charge is automatically spread or leveled.

Fig. 3 illustrates interlaced or loose woven asbestos.

Fig. 4 illustrates a woven wire frame or matrix.

In the drawings, the numeral 5 indicates an apron or carrier, which is operated preferably at high speed in any appropriate manner. The apron is inclined from the perpendicular and travels upwardly carrying the charge to appropriate pressure provisions indicated at 6. As illustrated in Fig. 1 the charge is delivered to the belt or apron in the form of a continuous jet or stream which is under considerable head or pressure. This may be accomplished, for example, by the gun indicated at 7. The ingredients, asbestos and cement, may be impelled and rendered plastic by water or wet steam, under pressure, or a ready-mixed more or less fluid or plastic charge may be forcibly projected by pneumatic power. Wet steam is advantageous because it acts with more celerity than water in permeating and wetting the inherently dry ingredients and because it obviates a dust-laden atmosphere.

We may, in lieu of mixing the asbestos material in a divided state, employ a fabric matrix or core in the form of a loose woven or interlaced sheet 8 of asbestos, as illustrated in Fig. 3. In practice this is superposed on and carried along with the belt 5 and charged with cement of proper fluid or plastic consistency. We sometimes employ a reinforce such as the woven structure 9, Fig. 4.

The wet mixing of the ingredients is initially started in the stream ranging from the gun to the apron and quickly concluded on impact. The force of impact together with the opposing forces of gravity and the upward lift or thrust of the apron operate to automatically spread the material which surges toward the sides substantially in the manner indicated in Fig. 2 so that when it reaches the pressure rolls it is substantially uniformly gaged or leveled.

A collector 10 in proximity with the lower end of the apron operates to arrest and lead away any excess fluid.

While we have specifically referred to asbestos and hydraulic cement, it will of course be understood that the invention contemplates any artificial stone material or combination of materials which may be applied and fabricated in the manner hereinbefore enlarged upon.

Having described the object and nature of the invention, we claim:—

1. The method herein-described, which consists in subjecting a mixture of artificial stone material to the impelling force of a blast, completing the mixing of such material by impact, and thereafter compacting it under pressure.

2. The method herein-described, which consists in subjecting a mixture of artificial stone material to the impelling force of a blast, completing the mixing and automatically spreading the material by impact with a mobile surface, and subjecting it to exerted pressure.

3. The method herein-described, which consists in subjecting a mixture of artificial stone material to the impelling force of a blast, completing the mixing of such material by impact with a rapidly moving apron crossing the path of the jet or blast, and then subjecting it to exerted pressure.

4. The method herein-described, which consists in subjecting a mixture of artificial stone material to the impelling force of a blast, completing the mixing of such material by impact with a rapidly moving apron crossing the path of the jet or blast, and immediately subjecting it to rolling under pressure.

5. The method herein-described, which consists in subjecting a mixture of artificial stone material to the impelling force of a blast, completing the mixing of such material by impact with a matrix or core carried by a rapidly moving apron crossing the path of the jet or blast, and subjecting the superposed elements to exerted pressure.

6. The method herein-described, which consists in subjecting a mixture of artificial stone material to the impelling force of a blast, completing the mixing of such material by impact with a loose woven or interlaced sheet of asbestos, and subjecting said sheet and mixture to exerted pressure.

7. The method herein-described, which consists in subjecting a mixture of artificial stone material to violent impact on a rapidly driven upwardly traveling inclined support, whereby the mixing is completed and the material is substantially gaged or leveled, and then subjecting it to pressure.

8. The method herein-described, which consists in subjecting a continuous charge of artificial stone material to violent impact on a rapidly driven upwardly traveling inclined support, whereby the mixing is completed and the material is substantially gaged or leveled, and then passing it through pressure rolls.

9. The method herein-described, which consists in subjecting a more or less fluid or plastic mixture of artificial stone material to the impelling force of a blast, in directing said blast against the surface of a rapidly driven upwardly traveling apron, whereby the mixture is substantially gaged or leveled and relieved of excess moisture, and then passing the mixture through pressure rolls.

10. Apparatus for the purpose stated, comprising the combination of a rapidly driven upwardly traveling inclined belt or apron, means for supplying it with a continuous charge of plastic material, and pressure rolls operatively disposed with relation to the apron.

In testimony whereof we affix our signatures.

ALFRED CROOK.
RICHARD D. CHAPMAN.